Feb. 18, 1958 — M. H. NOVEMBER — 2,823,702
HIGH PRESSURE CONVOLUTED METAL HOSE
Filed May 24, 1955
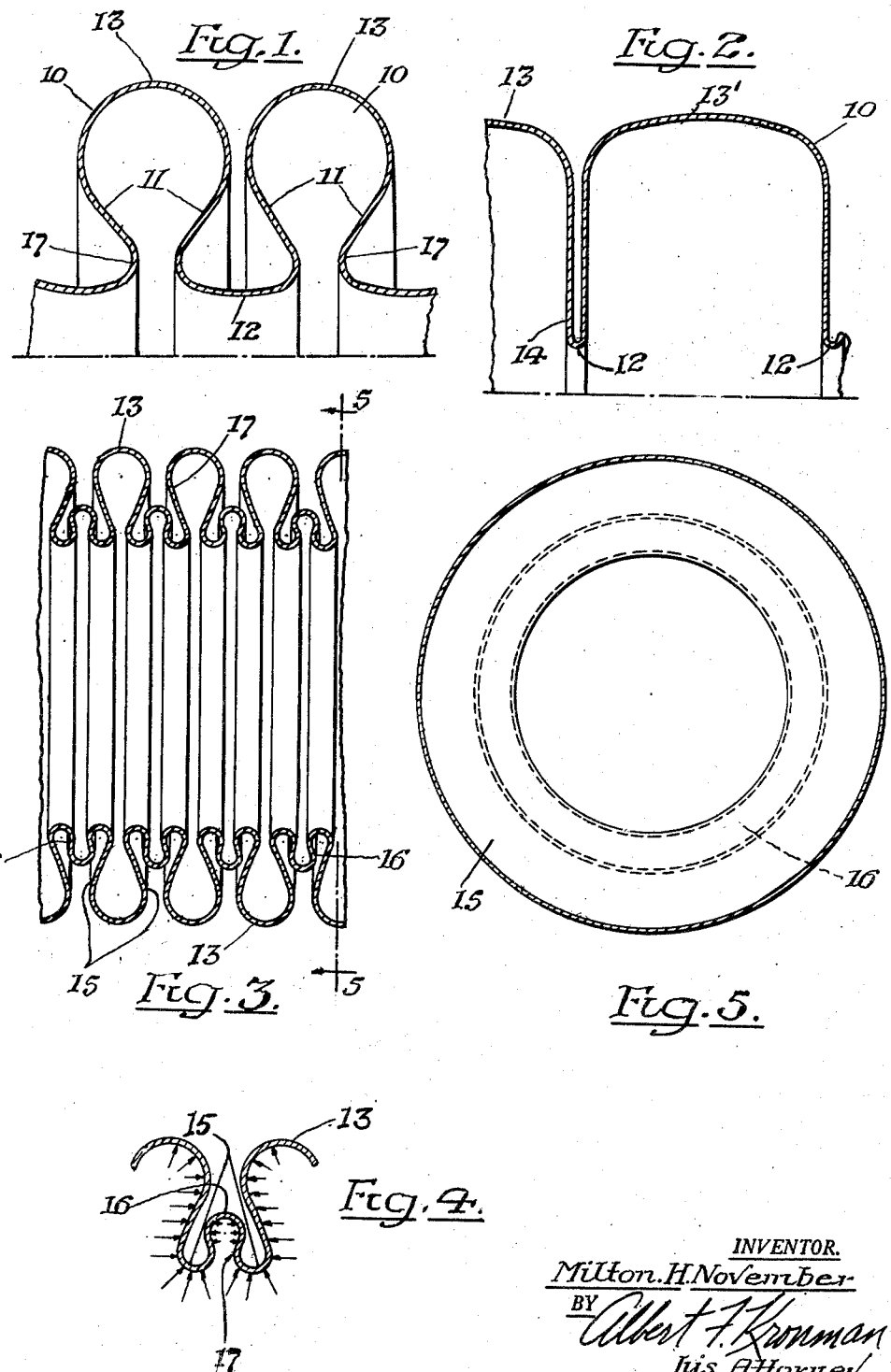
INVENTOR.
Milton H. November
BY Albert F. Kronman
his Attorney

United States Patent Office 2,823,702
Patented Feb. 18, 1958

2,823,702

HIGH PRESSURE CONVOLUTED METAL HOSE

Milton H. November, Montclair, N. J., assignor to Breeze Corporations, Inc., Union, N. J., a corporation of New Jersey Application May 24, 1955, Serial No. 510,602

2 Claims. (Cl. 138—50)

This invention relates to convoluted metal hose and particularly such as is used in connection with the transmission of fluids under extremely high pressure.

Presently known convoluted metal hose is prone to failure under conditions of extremely high internal pressure. In addition to bursting the wall of the hose the fluid pressure causes the hose to become rigid by reason of the fact that the original shape of the convolutions is changed into one less capable of flexing.

Accordingly, it is an object of the present invention to provide a convoluted metal hose which will be capable of withstanding extremely high internal pressure.

Another object of the present invention is to provide convoluted metal hose which will remain flexible following subjection to high internal pressures.

Another object of the present invention is to provide convoluted metal hose which may be fabricated with little difficulty and cost.

A further object of the present invention is to provide convoluted metal hose which will substantially retain its initial form despite excessive internal pressure.

A feature of the present invention is its novel wall form.

Another feature of the present invention is its integral construction.

A further feature of the present invention is its inexpensive construction which is formed from an integral length of tubing.

A feature of the present invention is its internal trough form which acts as a spring-like member, to cushion hydraulic shock.

The invention consists of the construction, combination and arrangement of parts, as herein illustrated, described and claimed.

In the accompanying drawing, forming a part hereof is illustrated one form of embodiment of the invention and in which:

Figure 1 is a fragmentary horizontal section taken through a length of conventional metal hose.

Figure 2 is a fragmentary view of the hose shown in Figure 1, after being subjected to excessive internal pressure.

Figure 3 is a fragmentary horizontal section of a complete embodiment of the present invention.

Figure 4 is a fragmentary view showing the specific wall form used in Figure 3 greatly enlarged with the arrows indicating the direction of the pressures applied by internal hydraulic fluid.

Figure 5 is a view taken on line 5—5 in Figure 3 looking in the direction of the arrows.

Referring to the drawings and particularly to Figures 1 and 2, 10 indicates a length of metal tube which has been formed with a series of convolutions 11, said convolutions having a substantial symmetrical shape. The troughs 12 and crests 13 of the convolutions 11 are substantially of the same shape and are formed and thereafter longitudinally compressed to add additional flexibility to the structure.

When the metal hose shown in Figure 1 is bent the troughs and crests can flex and separate if necessary for the purpose of allowing the metal hose to follow the desired path of a bend. However, it has been found that the ability of the metal hose 10 to bend depends upon its maintaining the convolution shape into which it was first placed. Under conditions of high internal pressure, the troughs 12 and crests 13 are mis-shaped as indicated at 14 and 13 in Figure 2 and the crests 13 become enlarged and lose their separation. Thereafter, any attempts to flex the hose will meet great resistance in view of the fact that the metal of the tubing wall is compressed and cannot separate in order to enable the hose to follow the desired path of bend.

Some attempts have been made to overcome this difficulty by devices employing spring-like members which were inserted into the troughs 12 of the tubing 11 so as to prevent the walls of the troughs 12 from being squeezed together in the manner shown at 14 in Figure 2. The springs or anti-distortion members often cause chafing at the point where they contacted the wall of the trough 12 and also resulted in the wall being damaged by the presence of said anti-distortion members under conditions of great internal stress. In addition, such anti-distortion members introduce additional weight to the structure and add greatly to the difficulty and cost of manufacturing such articles.

Referring now to Figures 3 and 4 it will be seen that there has been provided a convoluted metal hose of specifically different configuration from that shown in Figure 1. The trough 15 of the hose of Figure 3 is provided with an additional spring-like section 16 in the nature of an intermediate sized convolution which is formed between the full height convolutions of the hose. The spring-like section 16 acts as a spacer between the walls of the trough 15 and because the pressure of the internal fluids enters the intermediate convolutions 17 in the manner shown by the arrows in Figure 4, the trough 15 does not flatten out as does that shown in Figure 2 at 14. The fluid pressure is distributed along the internal interior of the wall form as indicated by the arrows in Figure 4 and the crests 13 are not moved together but remain in a separated condition, so that the flexibility of the entire structure is maintained. Similarly the side wall shape of the convolution indicated at 17 is preserved which shape is a factor in maintaining good flexibility.

Tubing of the type herein described has been employed for the purpose of conducting fluids at more than four thousand pounds of pressure. In testing such tubing it is necessary to raise the internal pressure far in excess of the working pressure during use. Under such tests previously known tubing were subject to failure and deformation such as shown in Figure 2, whereas the herein described tubing formed with the spring-like section 16 has been capable of withstanding extremely high pressures. Moreover, the present construction gives increased strength of the tube in the trough 15 in a radial direction thus reducing rim stresses found in previously known structures.

Hydraulic shock which is usually encountered in fluid bearing lines is minimized by reason of the resiliency of the novel trough structure and its behaviour under the forces indicated in Figure 4. By reducing the effects of hydraulic shock the useful life of the tubing has been greatly extended.

While the use of the novel trough section 16 has been shown and described in connection with somewhat conventional crest sections 13, it is within the purview of the present invention to combine the present trough section 16 with various types of crest sections such as, for example, those disclosed in my patent application Serial No. 493,492, filed March 10, 1955, in which an inverted convolution was employed in the crests for the purpose of reducing braid damage and other tubing failure.

While the foregoing description as applied to the drawings have disclosed annularly convoluted tubing it is within the purview of the present invention to form the spring-like section 16 in the wall of spirally convoluted tubes such as are well known in the art. The operation and efficiency of such forms of spirally convoluted tubing is improved by the additional spring-like section 16 in the same manner as has been set forth above in the discussion of the annularly convoluted tube.

Having thus fully described the invention, what is claimed as new and desired to be secured by Letters Patent of the United States is:

1. A convoluted flexible hose structure comprising, a continuous fluid tight tubular member, the wall of said member being formed into a series of crests and troughs, and an intermediate crest formed in each trough, the amplitude of said intermediate crest being less than that of the initial tube crest.

2. A convoluted flexible hose structure comprising, a continuous fluid tight tubular member, the wall of said member being formed into a series of annular crests and troughs, and an intermediate crest formed in each trough, the amplitude of said intermediate crest being less than that of the initial tube crest.

References Cited in the file of this patent

UNITED STATES PATENTS

| | | |
|---|---|---|
| 962,951 | Fulton | June 28, 1910 |
| 2,021,156 | Smith | Nov. 19, 1935 |
| 2,522,915 | Woods | Sept. 19, 1950 |
| 2,623,121 | Loveridge | Dec. 23, 1952 |

FOREIGN PATENTS

| | | |
|---|---|---|
| 595,009 | Germany | Mar. 15, 1934 |